Aug. 7, 1962 H. WILCKEN 3,047,924
SLIDING CLASP FASTENERS
Filed Oct. 20, 1959 2 Sheets-Sheet 1

INVENTOR:
HUGO WILCKEN
By
Richardson, David and Verdon
Attys.

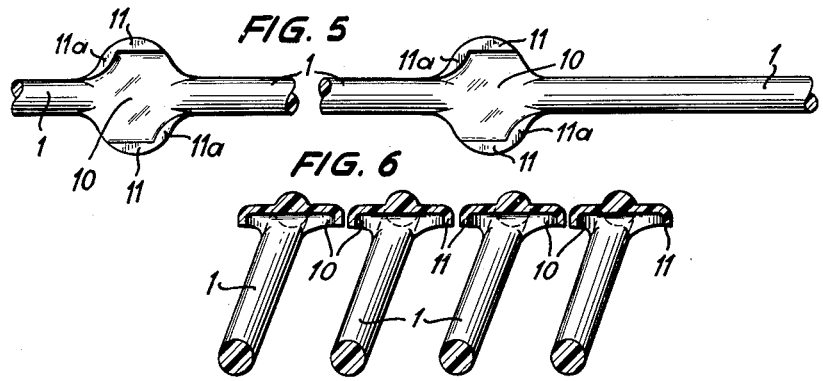
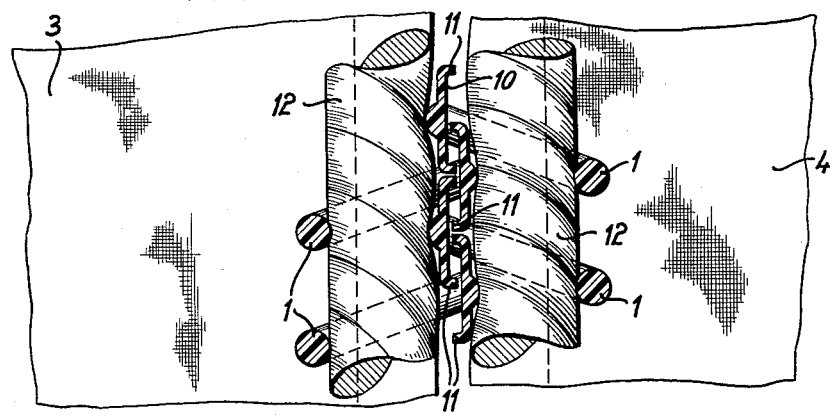
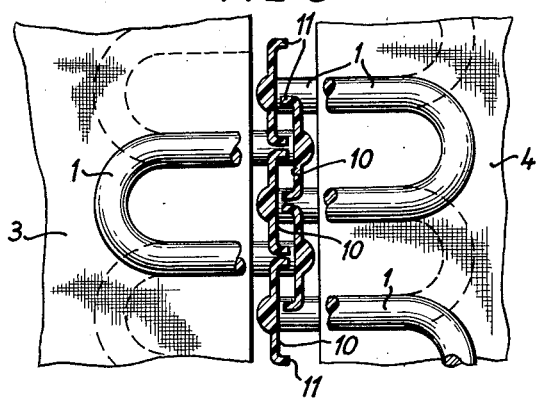
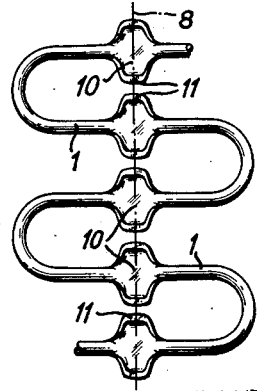
INVENTOR:
HUGO WILCKEN

United States Patent Office 3,047,924
Patented Aug. 7, 1962

3,047,924
SLIDING CLASP FASTENERS
Hugo Wilcken, Curau, Kreis Eutin, Holstein, Germany, assignor to Walter Erich Heilmann, Essen-Bredeney, Germany
Filed Oct. 20, 1959, Ser. No. 847,602
Claims priority, application Germany Oct. 24, 1958
3 Claims. (Cl. 24—205.13)

The present invention relates to sliding clasp fasteners whose fastener members are joined to two strips of a carrier stringer tape. The fastener members consist of interconnected windings or loops of a thread or filament made of plastic material located at facing edges of the two fastener strips, with coupling elements applied inside the fastener members in the longitudinal direction of the fasteners and projecting on both sides beyond the diameter of the thread.

This application is a continuation-in-part of my copending application Serial No. 798,939, filed March 12, 1959.

The interconnected fastener members each has the form of a helical spring provided with a filling core or filling cord. The helical spring has a cross-sectional profile which is preferably flattened, or the form of loops or bights disposed in two directions, which are bent in U-shape about a median longitudinal line. The helical springs are sewn or woven at one side or symmetrically to a carrier stringer tape, in such a manner that two such fastener strips of desired length form the sliding clasp fastener. The sliding clasp fastener is operated by means of a slider. The facing parts of the helical windings are stamped to provide coupling elements on their inner sides, which project on both sides beyond the diameter of the thread of the windings. If the interconnected fastener members have the form of two-way loops which are bent in U-shape about the median longitudinal line then these U-shaped loops may envelop the edge of a carrier stringer tape to which they are joined, the facing loop parts being similarly provided with transverse formations which project on both sides beyond the cross-section of the thread of the loops and form the coupling elements.

Known coupling elements are constituted by simple flattenings of the thread. These flattenings of the two rows of fastener members may become displaced relatively to one another when the sliding clasp fastener is closed, and when the sliding clasp fastener is subjected to bending, they do not ensure any safety against splitting either in the plane of the fastener or perpendicularly thereto.

A principal object of the invention consists in providing means in a sliding clasp fastener to avoid splitting in the plane of the fastener, even when bent extremely.

A further object consists in providing a sliding clasp fastener that will not split perpendicularly to the plane of the fastener.

It is a further object of the invention to ensure that the individual fastener members of a sliding clasp fastener may yield to any expansions or contractions of the carrier stringer tapes without thereby loosening the coupling engagement of the fastener members.

According to the invention, the coupling element of each winding or loop consists of a channel disposed on the inner side and having a bottom extending transversely of the thread of the winding or loop, the axis of said channel being disposed in the direction of the thread and being rectilinear or approximately rectilinear. The interconnected windings are provided with a filler core to be joined to the carrier stringer tape, or the loops are filled or nearly filled by the edge of a carrier stringer tape.

By means of this construction the coupling elements hook into each other along their boundary edges which are disposed parallel to the thread and are permanently maintained in this engagement by the flexibly yielding filler cord or by the edge of the carrier stringer tape.

As is further explained with reference to the specific embodiments, by suitably constructing the channels a mutual displacement of the individual fastener members perpendicularly to the plane of the fastener is effectively avoided.

According to a feature of the invention, the channels may, with respect to their area, project to any extent desired on both sides beyond the diameter of the thread, in such a manner that the channels of the windings or loops of the two fastener strips grip loosely at their rear portions in the longitudinal direction of the fastener so that the windings or loops may accommodate to variations of length of the carrier stringer tapes, which occur for example during changes in ambient humidity.

In order that the invention may be more clearly understood, reference will now be made to the accompanying drawings which show some specific embodiments of the invention by way of example and in which:

FIG. 5 is an unwound thread or a wire of plastic material or metal, with coupling elements according to the invention.

FIG. 6 is a longitudinal section through a thread according to FIG. 5 that has been helically wound.

FIG. 7 is a partial longitudinal section through a sliding clasp fastener along the line VII—VII of FIG. 2, to a greatly enlarged scale.

FIG. 8 is a partial plan view of a fastener according to FIG. 4 to a greatly enlarged scale with a section through the coupling elements and without a covering strip.

FIG. 9 is a partial view of a thread according to FIG. 5 which has loops disposed in two directions and from which the fastener according to FIGS. 4 and 8 is made.

Figure 1:
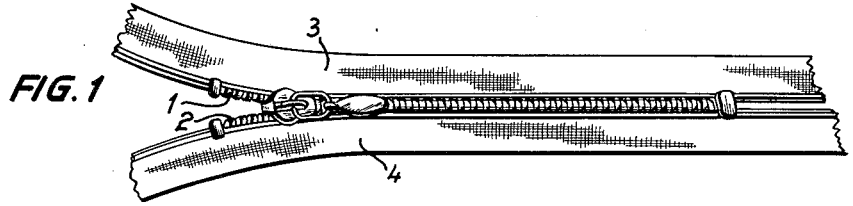
FIG. 1 is a schematic plan view of two fastener strips closed together.

Sliding clasp fasteners having interconnected rows of links in the form of helical springs or in the form of loops bent in two directions, which, by bending about the longitudinal medium axis, exhibit a U-shaped profile, are advantageously made of a thread of a plastic material for example polyamide, i.e. nylon. The two rows of links 1 and 2 are each joined, in accordance with FIG. 1, to a carrier stringer tape 3 and 4 in any suitable manner, for example by sewing on or by being woven thereon. In accordance with FIG. 2, the helical coil forming one row of links 1 has a flattened cross-section, is provided with a filler core 5 and is sewn at one side to and edge of the carrier stringer tape 3. The open upper side of the helical coil may be covered by a suitable needle stitch or by a narrow textile strip. According to FIG. 3 the helical coil 1 provided with the filler core 5 may be partially enveloped by the bifurcated edges 6 of stringer tape 3, wherein sewing-on may be effected. However, other joinings may be effected between the coil and the carrier stringer tape. According to FIG. 4 the row of fastener links consists of individual loops 7 which are for example made according to FIG. 9 by looping a thread 1 in a plane in opposite directions, the individual loops being then bent in U-shape at the median longitudinal line 8, in such a manner that the loops 7 may envelop in U-shape an edge of a stringer tape 3, whereupon it is possible to effect sewing-on by applying narrow covering strips 9 on both sides. It is also possible to bend the U-shaped limbs of the loops into one plane and then to sew them to one side of the carrier stringer tape. It is also possible to insert the looped polyamide thread 1 as a weft thread in a textile strip, this weft thread forming loops projecting on one edge of the strip.

Figure 2:
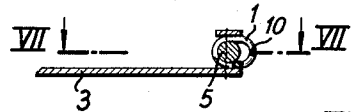
FIGS. 2 to 4 are three different schematic cross-sections through sliding clasp fastener strips.
Figure 3:
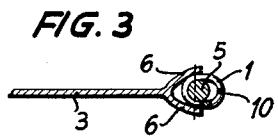
Figure 4:
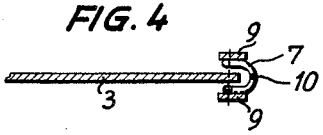

In order to be able to couple together sliding clasp fastener strips according to FIGS. 2 to 4, and to obtain in so doing a satisfactory security against splitting or inadvertent opening of the closed fastener, the arrangement may be adopted according to FIG. 5. The polyamide thread 1 is provided with uniformly-spaced formations on one side, by means of which there is produced a series of channels or recesses 10. The plane area of each channel projects on both sides beyond the diameter of the thread. Its axis or generatrix extends parallel to the thread. The plane area is rectilinear or approximately rectilinear. By this means the channel or recess is limited on both sides of the cross-section of the thread by edges 11 extending parallel to the thread 1. The channel may have a U-shaped, a circular or an oval profile. Other profiles may be employed if desired. This thread 1 is wound helically as shown in FIG. 6 in such a manner that the channels 10 are inwardly directed always at the same position of their circumference and are all disposed on the same side of the helical threads. The helical coil is advantageously flattened in cross-section, as is shown in FIGS. 2 and 3 and the internal channels are disposed on a narrow side and further the coil is provided with an axial filling core 12 according to FIGS. 2, 3 and 7, in such a manner that it is thereby possible to sew or weave the helical coils to the carrier stringer tape 3 or 4. The filler core consists of a textile cord or the like and should yield flexibly.

If, as shown in FIG. 1, two fastener strips are engaged by means of a slider, then the channels 10 shown in FIG. 7 of one of the rows of links engage by hooking their edges 11 in the channels 10 of the other row of links, this engagement being maintained by the filler core. In the embodiment according to FIGS. 6 and 7, the extent of the channel perpendicular to the direction of the thread is relatively large so that the boundary edges 11 of this channel overlap with a certain degree of looseness or play when the fastener is closed. In this embodiment it is possible for the carrier stringer tape 3 and 4 and the filler core 12, to expand and contract under humidiy changes, for example, the play between the couplings 10, 11 directly permitting such expansions or contractions without thereby hindering or upsetting the coupling engagement of the fastener members. It is even possible with this embodiment to manufacture the carrier stringer tape and the filler cord 12 from fabrics or cords which are flexibly extensible in the longitudinal direction so that the fastener may for example be employed with flexible girdles or the like.

It should be pointed out that, owing to the rectilinear shape of the channel 10, under certain circumstances the fastener may tend to split or open perpendicularly to the plane of the fastener, because the boundary edges 11 of the channels 10 of the two rows of fastener members which are in engagement may become displaced perpendicularly to the plane of the fastener. In order to avoid this displacement, ribs 11a (see FIG. 5) may be connected on one end of each boundary edge 11 of each channel 10, which ribs project inwardly and are diagonally opposite in each channel. This prevents a mutual displacement of the boundary edges 11 of two engaged fastener strips, perpendicularly to the plane of the fastener.

In loop or bight fasteners according to FIGS. 4, 8 and 9, similarly to the arrangements described in FIGS. 5 and 7, the loops may be provided with channels 10 on the median longitudinal line and boundary edges 11, and then the U-shaped bending is effected, whereupon these loops, as already mentioned, envelop in U-shape one edge of the carrier stringer tapes 3 and 4 and then are joined, by sewing etc., to the carrier stringer tape, in the manner explained. The two fastener strips according to FIG. 8 may then be engaged by means of a slider. If in this connection the coupling elements 10, 11 are sufficiently closely adjacent to the edges of the carrier stringer tapes 3 and 4, the mutual hook-shaped engagement may be maintained by the flexible yield of these strip edges, without employing cords 12 as shown in FIG. 7.

Figure 10:
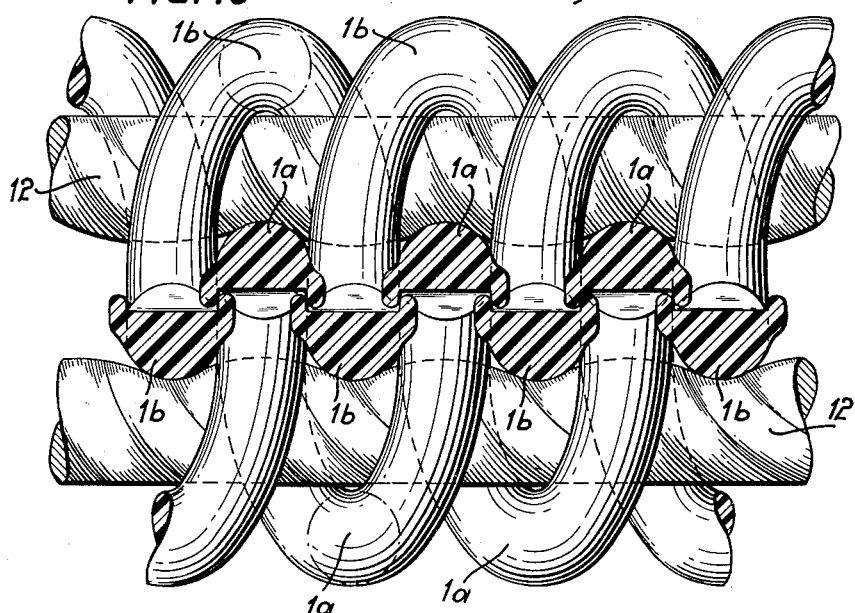
FIG. 10 is a partial section along the line VII—VII of FIG. 2 with a modified embodiment of the coupling elements shown to a greatly enlarged scale.
Figure 11:
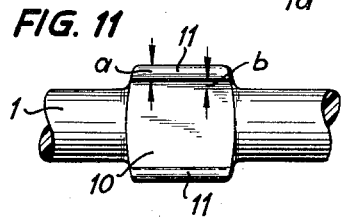
FIG. 11 is an internal plan view of a coupling element of the helical spring windings according to FIG. 10, and FIGS. 12 and 13 are cross-sections through different forms of the coupling elements of the plastic thread on an enlarged scale.
Figure 12:
Figure 13:
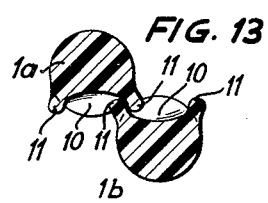

According to the embodiment of FIGS. 10 to 13, in order to avoid splitting or inadvertent opening of the sliding clasp fastener in the plane of the fastener as well as perpendicularly thereto, and in order to simplify the manufacture of the coupling elements, the following arrangement is adopted. The polyamide thread 1 according to FIG. 11 is provided with uniformly spaced channels 10. The generatrix or axis of said channel extends parallel to the thread 1 and is rectilinear or approximately rectilinear at its bottom. The limiting end edges 11 project laterally beyond the diameter of the thread and are formed with straight ribs having a thickness $a$ and a wider fillet $b$ (see FIG. 11). The channels are bounded by end walls whose planes extend perpendicular to the ribs and bottoms of the channels. The ribs of each channel in helical fastener are locked against the ribs, bottoms and end walls of two adjacent opposing channels in the other helical fastener. The bottom of each channel may be formed with a curved bottom which may be U-shaped, partially circular, oval or the like in cross-section. The axis of curvature of the channel bottom will be perpendicular to the axis of the helical turns of the fastener. After the thread is helically wound and provided with a flattened profile, or is disposed as loop or bight with U-shaped bends, on the median longitudinal line (FIGS. 8 and 9), two such fastener member strips may hook into one another on being mutually engaged by the action of a slider. The boundary edges 11 of one of the helical convolutions 1a or 1b, if extended, will intersect at least partially the end walls defined by the circumference of the thread of the other row of fastener members as may be seen in FIG. 10. Also in FIG. 10 the two helical coils 1a and 1b are provided with filler cords 12 which yield flexibly. The filler cords 12 thereby maintain the mutual hooking engagement, since these filler cords exert a flexible radial pressure. Splitting or opening in the plane of the fastener as well as in the plane perpendicular thereto is avoided by means of the hook engagement and the filler core, since the ends of the boundary edges 11 of the channels 10 at least partly cut the thread cross-section of the other row of links.

In the embodiment of FIG. 10 it is possible to make the length of the boundary edges 11 somewhat smaller than the extension of the channel 10 in the thread direction so that a certain looseness in relative longitudinal movement is permitted. The channel may be formed in U-shape, according to FIG. 12, the boundary edges 11 having rounded corners. It is also possible, according to FIG. 13, to construct the channel in partially circular or oval shape.

I claim:

1. A slide fastener structure, comprising a stringer tape, a fastener member joined to the stringer tape, said member being formed as a series of integrally interconnected helical turns from a single filament of flexible plastic material, each of said turns having a channel integrally formed inside the turn, each channel having a bottom extending parallel to the axis of the turn and projecting outwardly from the turn, each of the channels having straight ribs projecting outwardly of opposite edges of the channel, each of said turns being formed with walls at opposite ends of the channel, said walls having planes extending perpendicular to the ribs and bottom of the channel, and a yieldable core extending longitudinally through the turns of said fastener member substantially filling the turns.

2. A slide fastener comprising a pair of stringer tapes, a pair of elongated fastener members respectively joined to edges of the tapes, each of said members being formed as a series of integrally interconnected helical turns from a single filament of flexible plastic material, each of said turns having a channel integrally formed inside the turn, each channel having a bottom extending parallel to the axis of the turn and projecting outwardly from the turn, each of the channels having straight ribs projecting outwardly of opposite edges of the channel, each of said turns being formed with walls at opposite ends of the channel, said walls having planes extending perpendicular to the ribs and bottom of the channel, and a yieldable core extending longitudinally through the turns of said fastener member substantially filling the turns, the ribs of the channels of each fastener members engaging the bottoms of opposing channels of the other fastener member, and being confined between the end walls of said opposing channels, and said cores pressing the ribs of each fastener member into engagement with the channels of the other fastener member when the two fastener members are engaged.

3. A slide fastener member according to claim 2, wherein the bottoms of the channels in said turns are curved on axes perpendicular to the axes of the turns.

References Cited in the file of this patent

UNITED STATES PATENTS

| | | |
|---|---|---|
| 2,296,800 | Smith | Sept. 29, 1942 |
| 2,300,443 | Wahl | Nov. 3, 1942 |
| 2,929,135 | Cromberg | Mar. 22, 1960 |

FOREIGN PATENTS

| | | |
|---|---|---|
| 199,145 | Austria | Aug. 11, 1958 |
| 203,064 | Germany | Oct. 19, 1908 |
| 314,329 | Great Britain | May 15, 1929 |